United States Patent
Lee

(10) Patent No.: US 12,354,372 B2
(45) Date of Patent: Jul. 8, 2025

(54) METHOD OF RECOGNIZING REAR VEHICLE BASED ON IMAGE, AND APPARATUS AND VEHICLE THEREFOR

(71) Applicant: HYUNDAI MOBIS CO., LTD., Seoul (KR)

(72) Inventor: Jae Young Lee, Icheon-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 323 days.

(21) Appl. No.: 18/077,294

(22) Filed: Dec. 8, 2022

(65) Prior Publication Data
US 2023/0351770 A1    Nov. 2, 2023

(30) Foreign Application Priority Data
Apr. 29, 2022 (KR) .................. 10-2022-0053688

(51) Int. Cl.
| | | |
|---|---|---|
| G06V 20/00 | (2022.01) | |
| B60Q 9/00 | (2006.01) | |
| B60R 1/27 | (2022.01) | |
| G06V 10/764 | (2022.01) | |
| G06V 20/58 | (2022.01) | |

(52) U.S. Cl.
CPC ............. G06V 20/58 (2022.01); B60Q 9/008 (2013.01); B60R 1/27 (2022.01); G06V 10/764 (2022.01); *B60R 2300/8066* (2013.01)

(58) Field of Classification Search
CPC ...... G06V 20/58; G06V 10/764; G06V 10/25; G06V 10/82; G06V 20/584; G06V 2201/08; G06V 10/14; G06V 10/62; G06V 10/774; B60Q 9/008; B60R 1/27; B60R 2300/8066; B60W 50/14; B60W 2050/143; B60W 30/08; B60W 40/02; B60W 2420/403; G01J 1/0219; G06N 3/08; G06T 7/60; G06T 7/85
See application file for complete search history.

(56) References Cited

U.S. PATENT DOCUMENTS

| | | | |
|---|---|---|---|
| 6,831,572 B2 | 12/2004 | Strumolo et al. | |
| 8,665,079 B2 * | 3/2014 | Pawlicki | G01S 13/867 340/436 |
| 2007/0296564 A1 | 12/2007 | Howell et al. | |
| 2008/0013789 A1 * | 1/2008 | Shima | G06V 20/588 382/104 |
| 2013/0063600 A1 * | 3/2013 | Pawlicki | G01S 11/12 348/148 |
| 2015/0195496 A1 * | 7/2015 | Hayakawa | H04N 7/188 382/103 |
| 2017/0228606 A1 * | 8/2017 | Guan | G06T 7/90 |
| 2018/0165822 A1 * | 6/2018 | Uliyar | G06T 7/62 |
| 2022/0299322 A1 * | 9/2022 | Ikeda | B60W 60/0051 |
| 2023/0351770 A1 * | 11/2023 | Lee | G06V 20/584 |

* cited by examiner

*Primary Examiner* — Md K Talukder
(74) *Attorney, Agent, or Firm* — NovoTechIP International PLLC

(57) ABSTRACT

Disclosed are a method of recognizing a vehicle based on an image and an apparatus and vehicle therefor. A method of recognizing a rear vehicle in a vehicle includes acquiring an image captured by a camera while driving, determining a time zone based on the acquired image, performing object recognition based on the determined time zone, determining image coordinates of the rear vehicle based on a result of the object recognition, and converting the determined image coordinates into a distance.

12 Claims, 9 Drawing Sheets y : Image coordinates
d : Distance to rear vehicle
f : Focal point distance of camera (in units of image coordinates)
$Z_{cam}$ : Vertical mounting height of camera
θ : Vertical mounting angle of camera

METHOD OF RECOGNIZING REAR VEHICLE BASED ON IMAGE, AND APPARATUS AND VEHICLE THEREFOR

CROSS-REFERENCE TO RELATED APPLICATIONS

Pursuant to 35 U.S.C. § 119 (a), this application claims the benefit of Korean Patent Application No. 10-2022-0053688, filed on Apr. 29, 2022, which is hereby incorporated by reference as if fully set forth herein.

TECHNICAL FIELD

The present disclosure relates to a rear collision avoidance technology, and more particularly to a technology for recognizing a rear vehicle based on an original image captured by a camera mounted on a vehicle.

BACKGROUND

A rear collision warning (RCW) system is a system that warns a driver of an own vehicle when a risk of collision with an oncoming vehicle from the rear of the own vehicle is detected. The RCW system generally operates at a speed of 30 Km/h or less, and aims to minimize injuries due to rear collision by turning on hazard lights of the vehicle or operating an active seat belt when a rear collision is expected. In this case, the rear vehicle sensing the risk of collision may reduce a forward acceleration of the vehicle by operating brake just before collision.

US Patent Publication (US20070296564A1) and US Patent Publication (U.S. Pat. No. 6,831,572B2) disclose a method for preventing a collision and an apparatus therefor by recognizing a rear approaching vehicle using a RADAR mounted on a rear bumper of a vehicle and outputting a warning alarm to a driver when a collision is expected.

Currently, a detection range of a typical advanced driver assistance system (ADAS) sensor is concentrated in front of the vehicle. In a normal state, the vehicle drives forward, and thus when a forward danger is detected, the ADAS system is capable of controlling the vehicle to avoid a forward collision, but there is a disadvantage in that a collision caused by a rear approaching vehicle is not actively processed.

Various sensors such as RADARs, LiDARs, cameras, and ultrasonic sensors are mounted on the front of the vehicle to enhance recognition performance of forward danger and provide various driving assistance functions, but usually, only sensors for parking assistance are installed on the rear of the vehicle.

When an active sensor that transmits an actual signal, such as a RADAR and a LiDAR, is mounted on the rear of a vehicle, the active sensor may cause interference in a front sensor of a rear vehicle and deteriorate performance of a driving assistance system of the rear vehicle. In addition, when expensive active sensors such as RADARs and LiDARs are installed for the limited use of rear collision control, there is a problem that the price of the vehicle increases.

In the case of a general rear sensor, since a detection distance is relatively short compared to a front sensor, if a rear vehicle approaches at a high speed, a collision may occur before a collision response.

Therefore, a technology for effectively preventing a rear collision without significantly increasing vehicle price is required.

SUMMARY

An object of the present disclosure is to provide a method of recognizing vehicle based on an image, and an apparatus and vehicle therefor.

Another object of the present disclosure is to provide a method of recognizing a vehicle based on a camera image for recognizing a rear vehicle based on an original image of a camera mounted on the rear of a vehicle, and an apparatus and vehicle therefor.

Another object of the present disclosure is to provide a method of recognizing a vehicle based on an image for preventing deterioration of performance of a front sensor of a rear vehicle by recognizing a rear vehicle using an existing camera without adding a rear active sensor and separate hardware, and an apparatus and vehicle therefor.

Another object of the present disclosure is to provide a method of recognizing a vehicle based on an image for recognizing a remote rear vehicle through a proposed object recognition deep learning network, and an apparatus and vehicle therefor.

Another object of the present disclosure is to provide a method of recognizing a vehicle based on an image for enhancing object recognition performance by classifying and defining a learning parameter applied to an object recognition deep learning network depending on a time zone, day/night, and weather, and an apparatus and vehicle therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

According to an aspect, a method of recognizing a rear vehicle in a vehicle includes acquiring an image captured by a camera while driving, determining a time zone based on the acquired image, performing object recognition based on the determined time zone, determining image coordinates of the rear vehicle based on a result of the object recognition, and converting the determined image coordinates into a distance.

According to an embodiment, the determining the time zone based on the acquired image may include acquiring an output value of a light sensor, and calculating an average brightness of the image by rectifying the image, wherein the time zone may be determined based on the output value of the light sensor and the average brightness of the image.

According to an embodiment, a learning parameter of an object recognition deep learning network may be set based on the determined time zone, and the object recognition deep learning network may include a base network configured to extract a feature from the image, and an object detection head configured to classify an anchor box as a candidate area with a fixed position through data set learning, and adjust a position and size of a ground-truth bounding box having an intersection over unit (IoU) equal to or greater than a reference value among the classified anchor boxes.

According to an embodiment, the time zone may include a nighttime zone and a daytime zone, based on that the determined time zone is the day time zone, a learning parameter of the object recognition deep learning network may be set to a predefined daytime parameter, and based on the determined time zone is the night time zone, the learning parameter of the object recognition deep learning network may be set to a predefined nighttime parameter.

According to an embodiment, the nighttime parameter may include a first nighttime parameter for recognition of a headlamp area and a second nighttime parameter for recognition of a rear vehicle area.

According to an embodiment, the method may further include, when the time zone is the nighttime zone, acquiring a fixed exposure image by setting the camera to a fixed exposure time, recognizing the headlamp area based on the fixed exposure image, acquiring an auto exposure image by setting the camera to auto exposure, and recognizing the rear vehicle area based on the auto exposure image.

According to an embodiment, the method may further include determining whether the headlamp area is included in the rear vehicle area, wherein, when the headlamp area is included in the rear vehicle area, a lower end of the rear vehicle area may be determined as a lower end of the rear vehicle, and a distance to the rear vehicle may be calculated based on the determined lower end of the rear vehicle and a calibration value of the camera.

According to an embodiment, the method may further include, when recognition of the headlamp area is successful and recognition of the rear vehicle area fails, calculating a maximum headlamp mounting height based on a position of the headlamp area, wherein a lower end of the rear vehicle may be determined based on a lower end of the headlamp area and the maximum headlamp mounting height, and a distance to the rear vehicle may be calculated based on the determined lower end of the rear vehicle and a calibration value of the camera.

According to an embodiment, the calibration value may include a focal length value as a distance to an image plane from the camera, a vertical mounting height value to the camera from a ground, and a vertical mounting angle value of the camera.

According to an embodiment, the camera may include a surround view camera.

According to an embodiment, the method may further include calculating a speed of the rear vehicle based on a change in the distance for a predetermined time, and outputting a rear collision warning alarm based on the distance and the speed.

Another aspect provides a non-volatile computer-readable storage medium storing at least one computer program including an instruction that, when executed by at least one processor, cause the at least one processor to perform rear vehicle recognition operations, the operations including acquiring an image captured by a camera while driving, determining a time zone based on the acquired image, performing object recognition based on the determined time zone, determining image coordinates of the rear vehicle based on a result of the object recognition, and converting the determined image coordinates in to a distance.

According to another aspect, a vehicle includes a camera configured to capture a rear image while driving, a time zone determiner configured to determine a time zone based on the rear image, an object recognizer configured to recognize an object based on the determined time zone, and a calculator configured to determine image coordinates of a rear vehicle based on a result of the object recognition and convert the determined image coordinates into a distance.

According to an embodiment, the vehicle may further include a light sensor configured to measure an ambient illuminance, and a preprocessor configured to a rectification image by rectifying only a region of interest of the rear image, wherein the time zone determiner may calculate an average brightness of the rectification image and determine the time zone based on an output value of the light sensor and the average brightness.

According to an embodiment, the vehicle may further include a memory configured to store a plurality of learning parameters for an object recognition deep learning network, wherein the object recognizer may recognize an object by selecting and setting at least one learning parameter of the plurality of learning parameters according to the determined time zone.

According to an embodiment, the object recognition deep learning network may include a base network configured to extract a feature from the image, and an object detection head configured to classify an anchor box as a candidate area with a fixed position through data set learning, and adjust a position and size of a ground-truth bounding box having an intersection over unit (IoU) equal to or greater than a reference value among the classified anchor boxes.

According to an embodiment, the time zone may include a nighttime zone and a daytime zone, based on that the determined time zone is the day time zone, a learning parameter of the object recognition deep learning network may be set to a predefined daytime parameter, and based on the determined time zone is the night time zone, the learning parameter of the object recognition deep learning network may be set to a predefined nighttime parameter.

According to an embodiment, the nighttime parameter may include a first nighttime parameter for recognition of a headlamp area and a second nighttime parameter for recognition of a rear vehicle area.

According to an embodiment, when the time zone is the nighttime zone, the object recognizer may recognize the headlamp area based on a fixed exposure image acquired by setting the camera to a fixed exposure time and recognize the rear vehicle area based on auto exposure image acquired by setting the camera to auto exposure.

According to an embodiment, when the headlamp area is included in the rear vehicle area, the calculator may determine a lower end of the rear vehicle area as a lower end of the rear vehicle and calculate a distance to the rear vehicle based on the lower end of the rear vehicle and a calibration value of the camera.

According to an embodiment, when recognition of the headlamp area is successful and recognition of the rear vehicle area fails, the calculator may calculate a maximum headlamp mounting height based on a position of the headlamp area, determine a lower end of the rear vehicle based on a lower end of the headlamp area and the maximum headlamp mounting height, and calculate a distance to the rear vehicle based on the lower end of the rear vehicle and a calibration value of the camera.

According to an embodiment, the calibration value may include a focal length value as a distance to an image plane from the camera, a vertical mounting height value to the camera from a ground, and a vertical mounting angle value of the camera.

According to an embodiment, the camera may include a surround view camera.

According to an embodiment, the calculator may calculate a speed of the rear vehicle based on a change in the distance for a predetermined time, and the vehicle may further include a warning alarm part configured to generate a rear collision warning alarm based on the distance and the speed.

The aspects of the disclosure are only a part of the preferred embodiments of the disclosure, and various embodiments based on technical features of the disclosure may be devised and understood by the person with ordinary skill in the art based on the detailed description of the disclosure.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

DETAILED DESCRIPTION

Figure 1:
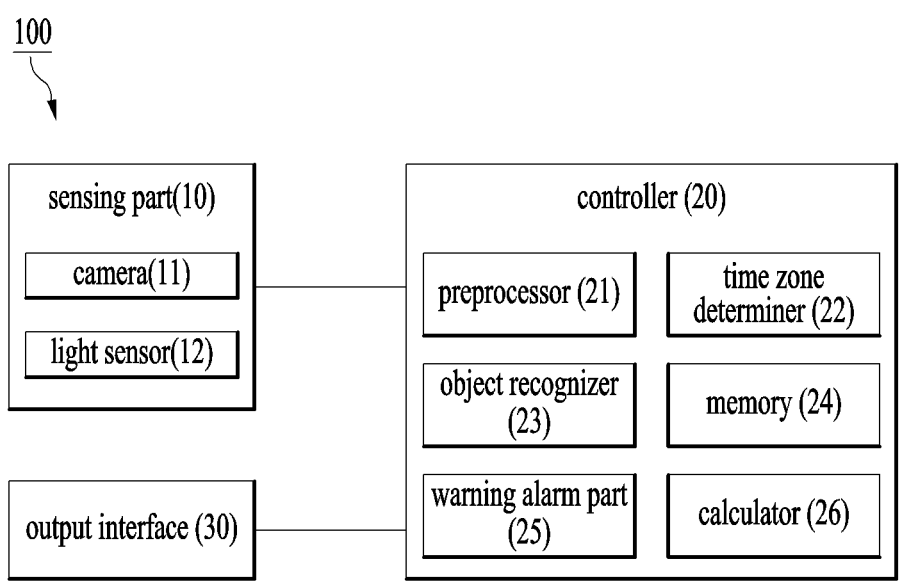
FIG. 1 is a block diagram illustrating a configuration of a rear vehicle recognition apparatus according to an embodiment of the present disclosure.

Hereinafter, some embodiments of the present disclosure will be described in detail with reference to the accompanying drawings. In the following description, like reference numerals designate like elements although the elements are shown in different drawings. Further, in the following description of the embodiments of the present disclosure, a detailed description of known functions and configurations incorporated herein will be omitted for clarity and brevity.

It will be understood that, although the terms first, second, A, B, (a), (b), etc. may be used herein to describe various elements of the present disclosure, these terms are only used to distinguish one element from another element and essential, order, or sequence of corresponding elements are not limited by these terms. Unless otherwise defined, all terms including technical and scientific terms used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In various examples of the present disclosure, "/" and "," need to be construed as indicating "and/or." For example, "A/B" may mean "A and/or B." Furthermore, "A, B" may mean "A and/or B." Furthermore, "A/B/C" may mean "at least one of A, B, and/or C." Furthermore, "A, B, and C" may mean "at least one of A, B and/or C."

In various examples of the present disclosure, "or" needs to be construed as indicating "and/or." For example, "A or B" may include "only A," "only B," and/or "both A and B." In other words, "or" needs to be construed as indicating "additionally or alternatively."

Hereinafter, embodiments of the present disclosure will be described in detail with reference to FIGS. 1 to 9.

FIG. 1 is a block diagram illustrating a configuration of a rear vehicle recognition apparatus according to an embodiment of the present disclosure.

In the following embodiments, the rear vehicle recognition apparatus is described to be mounted on a vehicle as an example, but this is only one embodiment and may be applied to other transportation devices such as UAMs, drones, and ships.

Referring to FIG. 1, a rear vehicle recognition apparatus 100 may broadly include a sensing part 10, a controller 20, and an output interface 30.

The sensing part 10 may provide various pieces of sensing information to the controller 20.

For example, the sensing part 10 may include a camera 11 and a light sensor 12.

The camera 11 may capture a rear image through a fisheye lens and may provide the captured rear image-hereinafter, used in combination with an original image to the controller 20.

The light sensor 12 may measure ambient illuminance and may provide the measured illuminance value to the controller 20.

The controller 20 may include at least one of a preprocessor 21, a time zone determiner 22, an object recognizer 23, a memory 24, a warning alarm part 25, or a calculator 26.

The preprocessor 21 may preprocess sensing information acquired from the sensing part 10.

For example, the preprocessor 21 may generate a rectification image by rectifying the original image captured by the camera 11. In detail, the preprocessor 21 may generate a rectification image by removing a distorted region of the original image based on lens information of the camera 11 and rectifying only a region of interest. The region of interest, which is a rear region of the vehicle, is a region with low distortion, and thus may be recognized by a long-distance vehicle during rectification.

The time zone determiner 22 may calculate an average brightness of the rectification image, and determine a time zone based on an output value of the light sensor 12 and the average brightness value of the rectification image.

According to an embodiment, the time zone may be divided into a nighttime zone and a daytime zone.

For example, when the output value of the light sensor corresponds to "night" and the average brightness value of the rectification image is equal to or less than a reference value, the time zone determiner 22 may determine the time zone as a nighttime zone. If there are many streetlights around a road and the average brightness value of the rectification image exceeds a reference value even at night, the time zone may be determined as a daytime zone.

According to an embodiment, when the determined time zone is a daytime zone, a learning parameter of an object recognition deep learning network used for object recognition may be set to a predefined daytime parameter, and when the determined time zone is a nighttime zone, the learning parameter of the object recognition deep learning network may be set to a predefined nighttime parameter. Object recognition performance may be advantageously improved by classifying and setting learning parameters optimized for daytime and nighttime.

According to an embodiment, the nighttime parameter may include a first nighttime parameter for recognizing a headlamp area of the rear vehicle and a second nighttime parameter for recognizing a rear vehicle area.

The memory 24 may maintain a plurality of learning parameters for the aforementioned object recognition deep learning network.

When the time zone is a nighttime zone, the object recognizer 23 may acquire a fixed exposure image by setting the camera 11 to a fixed exposure time and recognize the headlamp area based on the acquired fixed exposure image.

When the time zone is a nighttime zone, the object recognizer 23 may acquire an auto exposure image by setting the camera 11 to auto exposure and recognize the rear vehicle area based on the acquired auto exposure image.

As a result, when the time zone is a nighttime zone, the object recognizer 23 may recognize the headlamp area and rear vehicle area of the rear approaching vehicle using the short exposure image and auto exposure image.

When recognition of both the headlamp area and the rear vehicle area is successful by the object recognizer 23, the calculator 26 may determine whether the headlamp area is included in the rear vehicle area. As the determination result, if the headlamp area is included in the rear vehicle area, the calculator 26 may determine a lower end of the rear vehicle area as a lower end of the rear vehicle. The calculator 26 may calculate a distance to the rear vehicle based on the lower end of the rear vehicle and a calibration value of the camera. Here, a specific method of calculating the distance to the rear vehicle based on image coordinates and the calibration value will become clearer through the description of the drawings to be described later.

When recognition of the headlamp area recognition is successful by the object recognizer 23 and recognition of the rear vehicle area fails, the calculator 26 may calculate the maximum headlamp mounting height based on the position of the recognized headlamp area, and determine the lower end of the rear vehicle based on the lower end of the lower end of the headlamp area and the calculated maximum headlamp mounting height. The calculator 26 may calculate the distance to the rear vehicle based on the lower end of the rear vehicle of the calibration value of the rear camera. Here, a specific method of calculating the distance to the rear vehicle based on image coordinates and the calibration value will become clearer through the description of the drawings to be described later.

According to an embodiment, the calibration value may include a focal length value that is the distance from the camera to an image plane, a vertical mounting height value from the ground to the camera, and a vertical mounting angle value of the camera.

In the present specification, a camera is a device for acquiring an image, and the name may not limit the scope of the present disclosure. For example, the camera may be a rear camera for photographing the rear of the vehicle. Alternatively, the camera may include at least one camera or at least one surround view camera configured as an image sensor. The surround view camera include at least one camera or at least one image sensor configured to monitor the surroundings of the vehicle.

The calculator 26 according to an embodiment may also calculate a speed of the rear vehicle based on a change in the distance to the rear vehicle for a predetermined time.

The warning alarm part 25 may adaptively generate a rear collision warning alarm based on the distance to the rear vehicle calculated by the calculator 26 and/or the speed of the rear vehicle and may output the rear collision warning alarm through the output interface 30.

The output interface 30 may include a speaker, a display, and a vibration element and output various warning alarm messages through voice/image/text/vibration pattern, etc.

Figure 2:
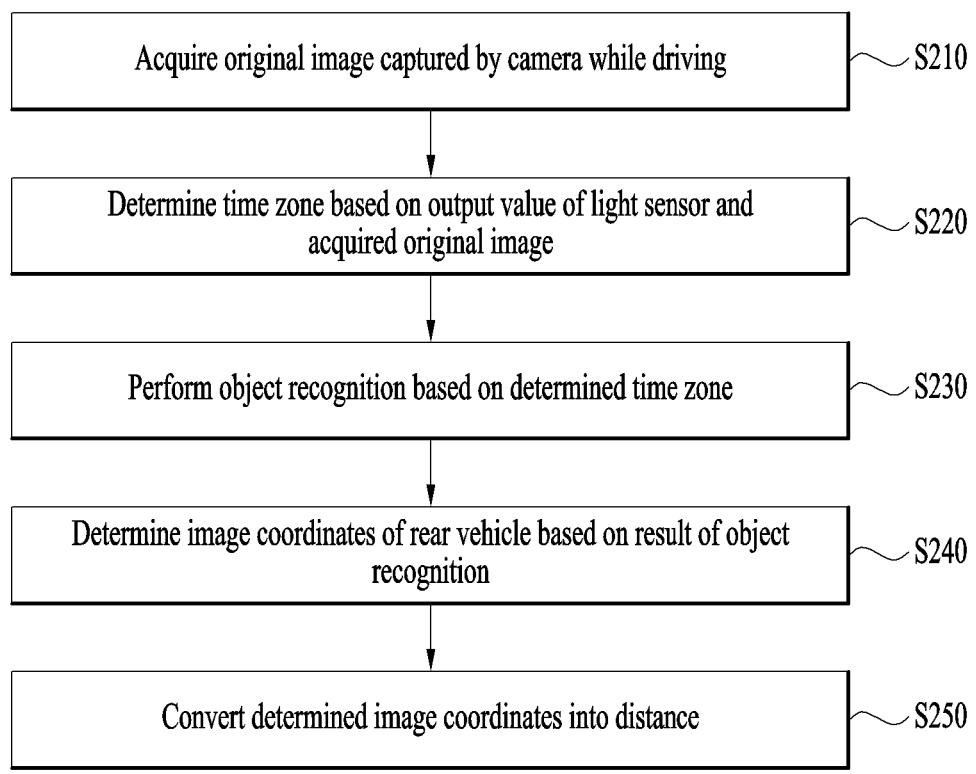
FIG. 2 is a flowchart of a method of recognizing a vehicle based on an image according to an embodiment of the present disclosure.

FIG. 2 is a flowchart for explaining a method of recognizing a vehicle based on an image according to an embodiment of the present disclosure.

Referring to FIG. 2, a vehicle may acquire an original image captured by a camera while driving (S210).

The vehicle may determine the time zone based on the output value of the light sensor and the acquired original image (S220). Here, the determined time zone may be any one of a daytime zone and a nighttime zone. The vehicle may generate a rectification image for a central region having relatively little distortion among the output value of the light sensor and the original image, i.e., a region of interest, and calculate an average brightness value of the generated rectification image. For example, the vehicle may determine the time zone as the nighttime zone based on the light sensor value being "night" and the average brightness value being less than or equal to a predetermined reference value, and in other cases, the vehicle may determine the time zone as the daytime zone.

The vehicle may perform object recognition based on the determined time zone (S230).

According to an embodiment, when the time zone is a nighttime zone, the vehicle may acquire a fixed exposure image by setting the camera 11 to a fixed exposure time, and recognize the headlamp area based on the acquired fixed exposure image. In addition, when the time zone is a nighttime zone, the vehicle may acquire an auto exposure image by setting the camera 11 to auto exposure, and recognize the rear vehicle area based on the acquired auto exposure image. As a result, when the time zone is the nighttime zone, the vehicle may recognize the headlamp area and the rear vehicle area of the rear approaching vehicle using both the short exposure image and the auto exposure image.

The vehicle may determine image coordinates of the rear vehicle based on a result of the object recognition (S240).

The vehicle may convert the determined image coordinates into a distance (S250).

The vehicle may determine whether the headlamp area is included in the rear vehicle area when recognition of both the headlamp area and the rear vehicle area is successful. As the determination result, if the headlamp area is included in the rear vehicle area, the vehicle may determine the lower end of the rear vehicle area as the lower end of the rear vehicle. The vehicle may calculate the distance to the rear vehicle based on the calibration values of the lower end of the rear vehicle and the camera. Here, a specific method of calculating the distance to the rear vehicle based on the image coordinates and the calibration value will become clearer through the description of the drawings to be described later.

When recognition of the headlamp area recognition is successful and recognition of the rear vehicle area fails, the vehicle may calculate the maximum headlamp mounting height based on the position of the recognized headlamp area, and determine the lower end of the rear vehicle based on the lower end of the lower end of the headlamp area and the calculated maximum headlamp mounting height. The vehicle may calculate the distance to the rear vehicle based on the lower end of the rear vehicle of the calibration value of the camera. Here, a specific method of calculating the distance to the rear vehicle based on image coordinates and the calibration value will become clearer through the description of the drawings to be described later.

According to an embodiment, the calibration value may include a focal length value that is the distance from the camera to an image plane, a vertical mounting height value from the ground to the camera, and a vertical mounting angle value of the camera.

Figure 3:
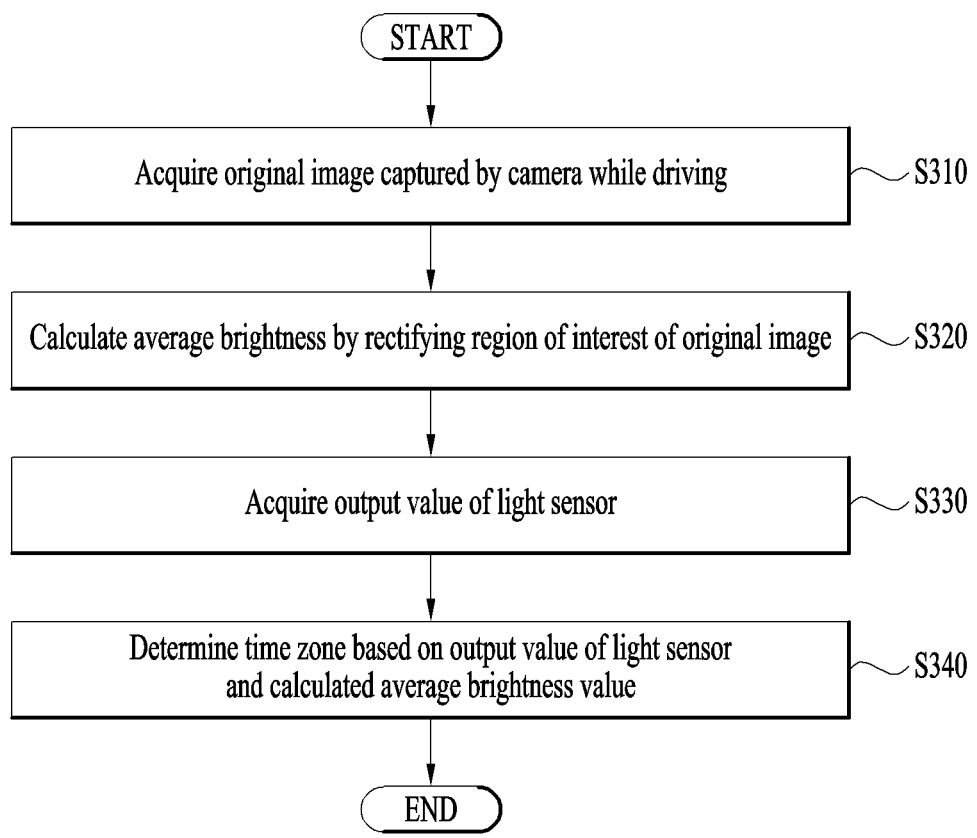
FIG. 3 is a flowchart of a method of determining a time zone for setting a learning parameter of an object recognition deep learning network according to an embodiment of the present disclosure.

In the present specification, a camera is a device for acquiring an image, and the name may not limit the scope of the present disclosure. For example, the camera may be a rear camera for photographing the rear of the vehicle. Alternatively, the camera may include at least one camera or at least one surround view camera configured as an image sensor. FIG. 3 is a flowchart for explaining a method of determining a time zone for setting a learning parameter of an object recognition deep learning network according to an embodiment of the present disclosure.

Referring to FIG. 3, the vehicle may acquire an original image captured by a camera while driving (S310).

The vehicle may generate a rectification image by rectifying a region of interest of an original image and calculating an average brightness of the generated rectification image (S320).

The vehicle may acquire the output value of the light sensor (S330).

The vehicle may determine a time zone based on the output value of the light sensor and the calculated average brightness value (S340).

According to an embodiment, the time zone may be classified into a nighttime zone and a day time zone.

According to an embodiment, when the determined time zone is a daytime zone, a learning parameter of an object recognition deep learning network used for object recognition may be set to a predefined daytime parameter, and when the determined time zone is a nighttime zone, the learning parameter of the object recognition deep learning network may be set to a predefined nighttime parameter. Rear object recognition performance may be improved by adaptively setting a learning parameter optimized for daytime and nighttime.

According to an embodiment, the nighttime parameter may include a first nighttime parameter for recognizing a headlamp area and a second nighttime parameter for recognizing a rear vehicle area.

Figure 4:
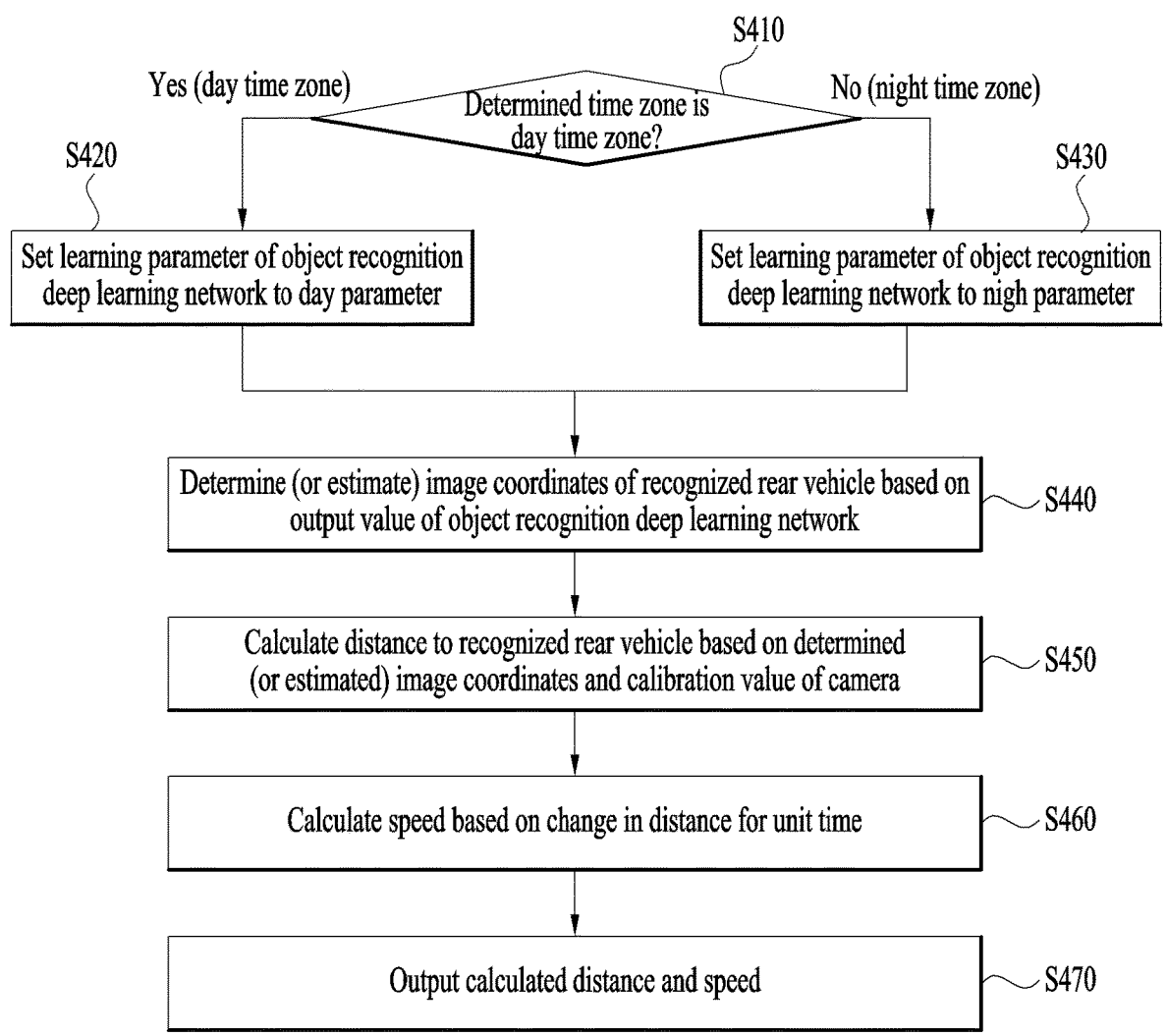
FIG. 4 is a flowchart of a method of calculating a distance and a speed of a rear vehicle by setting a learning parameter of an object recognition deep learning network according to a determined time zone according to an embodiment of the present disclosure.

FIG. 4 is a flowchart for explaining a method of calculating a distance and a speed of a rear vehicle by setting a learning parameter of an object recognition deep learning network according to a determined time zone according to an embodiment of the present disclosure.

Referring to FIG. 4, the vehicle may determine whether the determined time zone is a daytime zone (S410).

As the determination result, when the time zone is a daytime zone, the vehicle may set the learning parameter of the object recognition deep learning network to a daytime parameter (S420).

As the determination result of operation 410, when the time zone is a nighttime zone, the vehicle may set the learning parameter of the object recognition deep learning network to a nighttime parameter (S430).

The vehicle may determine (or estimate) image coordinates of the recognized rear vehicle based on an output value of the object recognition deep learning network (S440).

The vehicle may calculate a distance to the recognized rear vehicle based on the determined (or estimated) image coordinates and the calibration value of the camera (S450).

The vehicle may calculate the speed of the recognized rear vehicle based on a change in distance for a unit time (S460).

The vehicle may output the distance and speed calculated for the rear vehicle through an output device included therein (S470).

For example, the vehicle may determine the possibility of rear collision based on the distance to the vehicle approaching from the rear and a driving speed of the rear vehicle, and as the determination result, when a risk of rear collision is detected, a predetermined warning alarm message may be generated and output.

According to an embodiment, when detecting the risk of rear collision, the vehicle may control braking/driving speed/hazard warning light/active safety belt of the vehicle by controlling corresponding electronic control parts, thereby reducing a risk of additional collision with a preceding vehicle and user harm in the case of rear collision.

Figure 5:
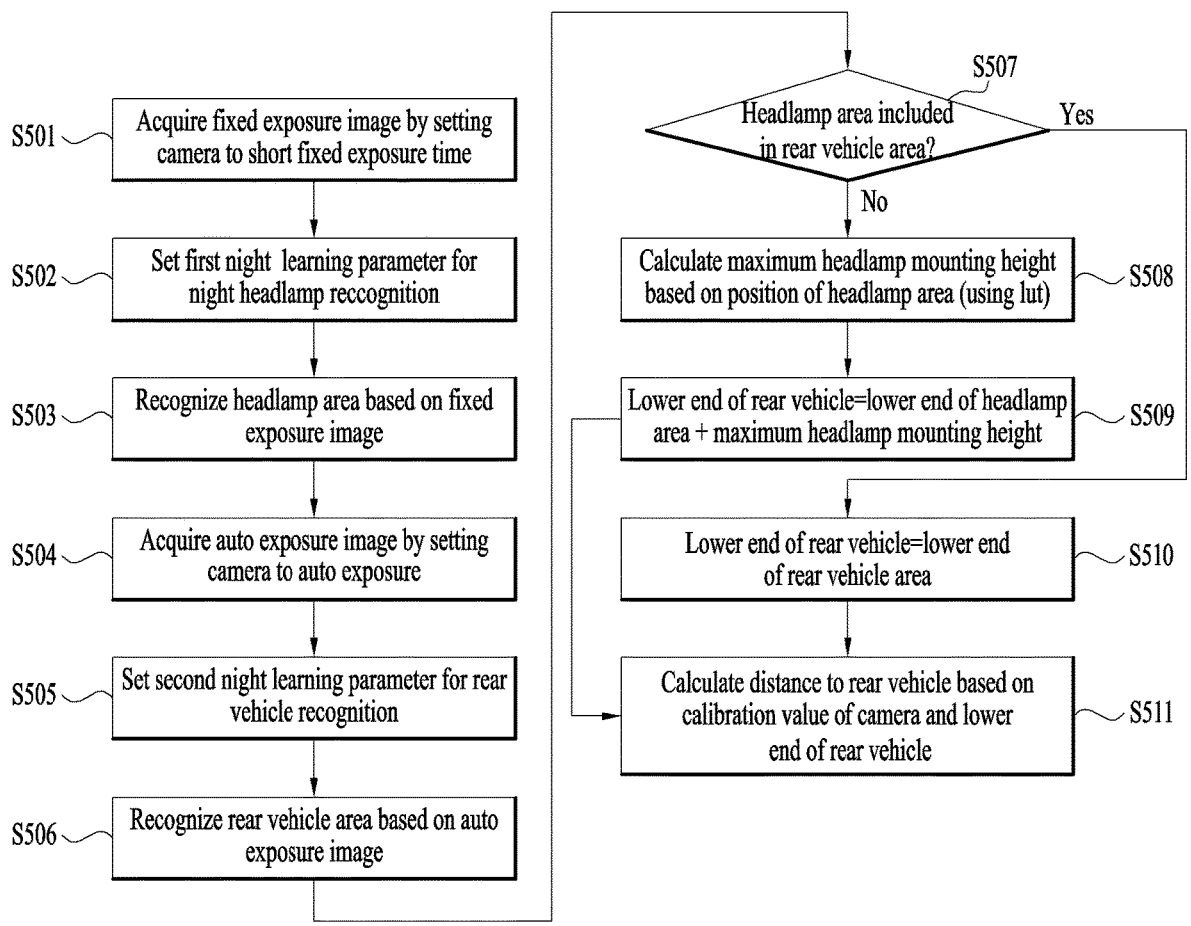
FIG. 5 is a flowchart of a procedure for calculating a distance to a rear vehicle by setting a learning parameter corresponding to a nighttime zone according to an embodiment of the present disclosure.

FIG. 5 is a flowchart for explaining a procedure of calculating a distance to a rear vehicle by setting a learning parameter corresponding to a nighttime zone according to an embodiment of the present disclosure.

Referring to FIG. 5, when a recognition procedure of a rear vehicle of a nighttime zone starts, the vehicle may acquire a fixed exposure image by setting a camera to a fixed exposure time (S501).

The vehicle may set a first night learning parameter for night headlamp recognition (S502).

The vehicle may recognize a headlamp area based on the fixed exposure image (S503). That is, the vehicle may recognize the headlamp area by inputting the fixed exposure image to an object recognition deep learning network.

The vehicle may acquire an auto exposure image by setting the camera to an auto exposure (S504).

The vehicle may set a second night learning parameter for rear vehicle recognition (S505).

The vehicle may recognize a rear vehicle area based on the auto exposure image (S506). That is, the vehicle may recognize a rear vehicle area by inputting the auto exposure image to the object recognition deep learning network.

The vehicle may determine whether the headlamp area is included in the recognized rear vehicle area (S507).

As the determination result, when the headlamp area is not included in the rear vehicle area, the vehicle may calculate the maximum headlamp mounting height based on the position of the headlamp area (S508). In this case, the maximum height value of the headlamp occupies a plurality of pixels of the corresponding image but occupies few pixels from a far distance, and thus the vehicle may compensate for this by applying a predefined look-up table (LUT) filter according to the position of the headlamp area.

The vehicle may determine the lower end of the rear vehicle using the sum of the lower end of the headlamp area and the maximum headlamp mounting height (S509).

In contrast, as the determination result of operation 507, when the headlamp area is included in the rear vehicle area, the vehicle may determine the lower end of the recognized rear vehicle area as the lower end of the rear vehicle (S510)

The vehicle may calculate the distance to the rear vehicle based on the calibration value of the camera and the determined lower end of the rear vehicle (S511).

As described above, the vehicle according to the present disclosure may estimate the position of the rear vehicle using two rectification images, i.e., the fixed exposure image and the auto exposure image acquired by differently setting an exposure time in a nighttime zone, thereby advantageously cutting an output frame rate in half and improving the object recognition performance in the nighttime zone.

Figure 6:
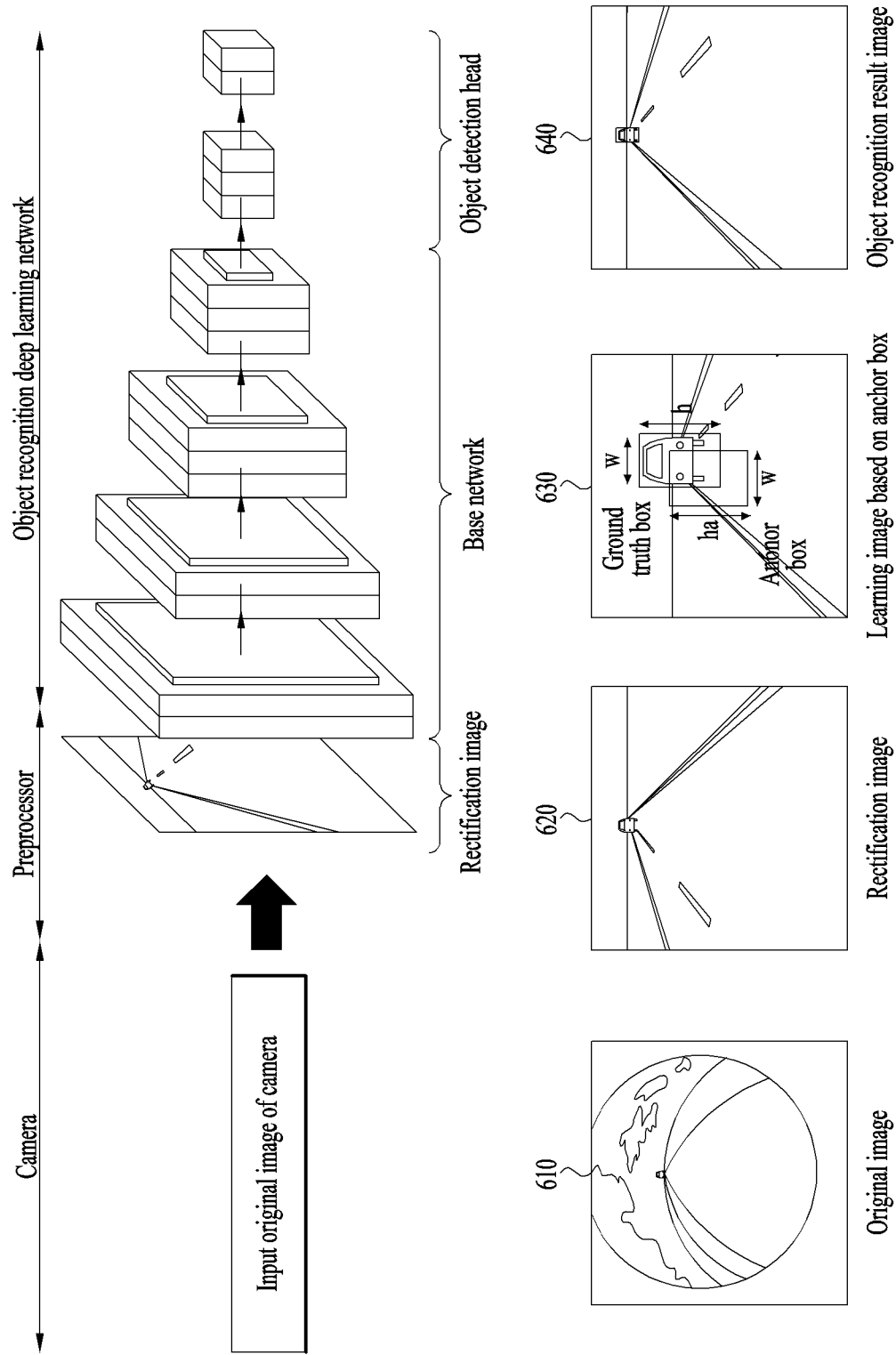
FIG. 6 illustrates a procedure of recognizing a rear object based on a camera image according to an embodiment of the present disclosure.

FIG. 6 illustrates a procedure of recognizing a rear object based on a camera image according to an embodiment of the present disclosure.

Referring to FIG. 6, an original image 610 of a camera may be input to a preprocessor. In this case, the original image 610 of the camera may be rectified by a preprocessor and converted into a rectification image 620 from which a distorted portion is removed by a fisheye lens.

A base network of a learning network of an object recognition deep learning network may generate an anchor box-based learning image 630 by extracting the feature of an image based on the input rectification image 620.

An object recognition head may classify an anchor box, a candidate area, or a predicted bounding box based on the features extracted by the base network and the input the anchor box-based learning image 630 and adjust the position and size of the ground-truth bounding box.

According to an embodiment, as the base network, a classification network such as ResNet or VGG16 may be applied and may start learning using a weight value determined through learning from a data set such as ILSVRC2012.

The object recognition head may perform learning to make a position and a classification value using a network output value for an anchor box with an Intersection over Union (IoU) value of 50% or more with a ground-truth bounding box among anchor boxes with a fixed position.

Here, the network output value may be represented using Equation 1 below.

$$\left( \frac{x - x_a}{w_a}, \frac{y - y_a}{h_a}, \log\frac{w}{w_a}, \log\frac{h}{h_a}, c \right) \quad \text{[Equation 1]}$$

Here, xa, ya, ha, and wa may be constant values indicating the center point (xa, ya) and the height and width of the anchor box as indicated by reference numeral 630. x, y, w, and h may represent the center point (x, y), height (h), and width (w) of the recognized object and may be acquired using the network output value of Equation 1. c may be a classification value, which refers to a background and the state of a vehicle. According to an embodiment, L1 loss may be used to learn a position value, and cross entropy loss may be used to learn a classification value. A network weight may be updated using a stochastic gradient descent method.

Figure 7:
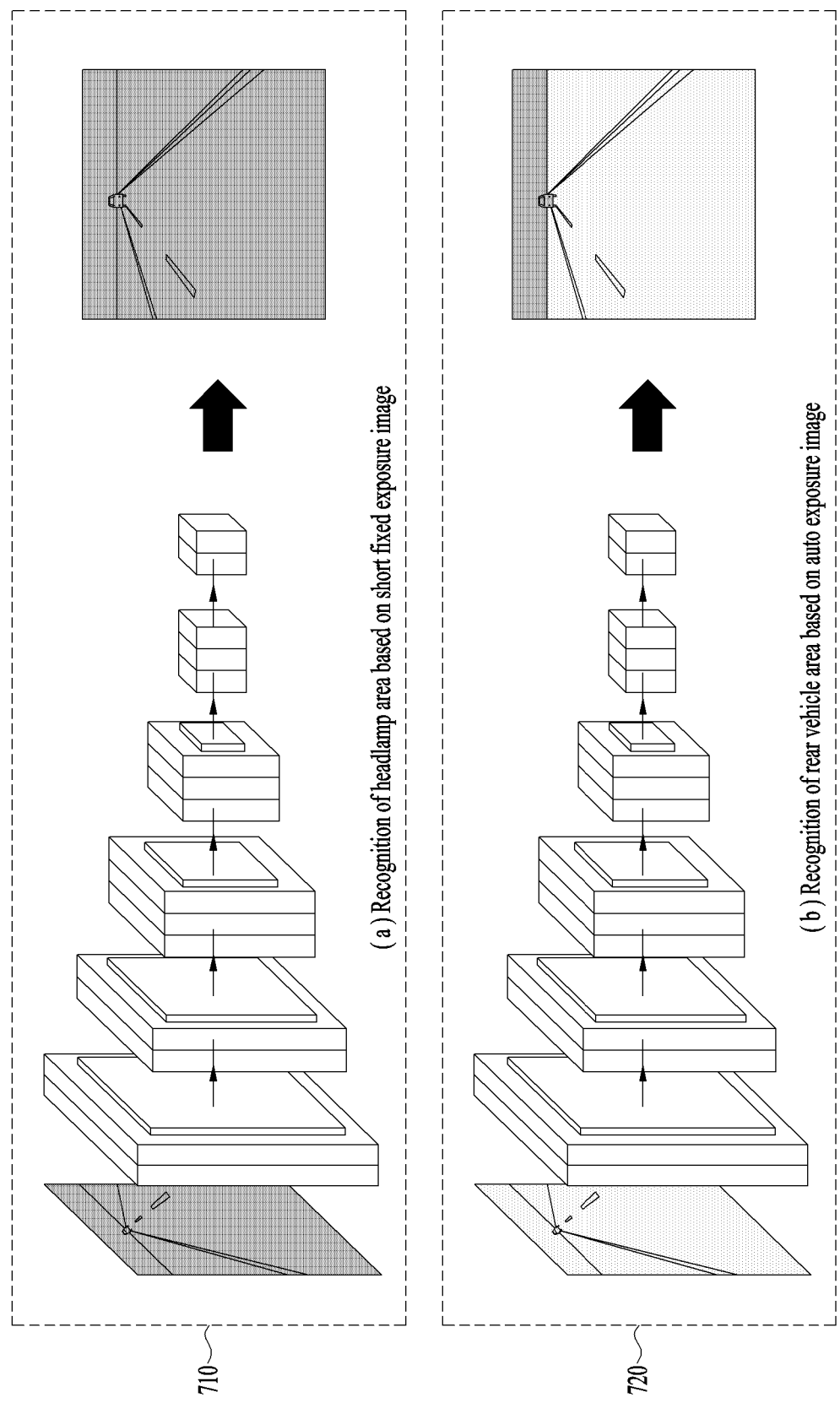
FIG. 7 illustrates a nighttime zone object recognition method according to an embodiment of the present disclosure.

FIG. 7 illustrates a nighttime zone object recognition method according to an embodiment of the present disclosure.

Referring to reference numeral 710 of FIG. 7, a headlamp area of a rear approaching vehicle may be recognized through learning for a fixed exposure image.

Referring to reference numeral 720, a rear vehicle area may be recognized through learning for an auto exposure image.

Figure 8:
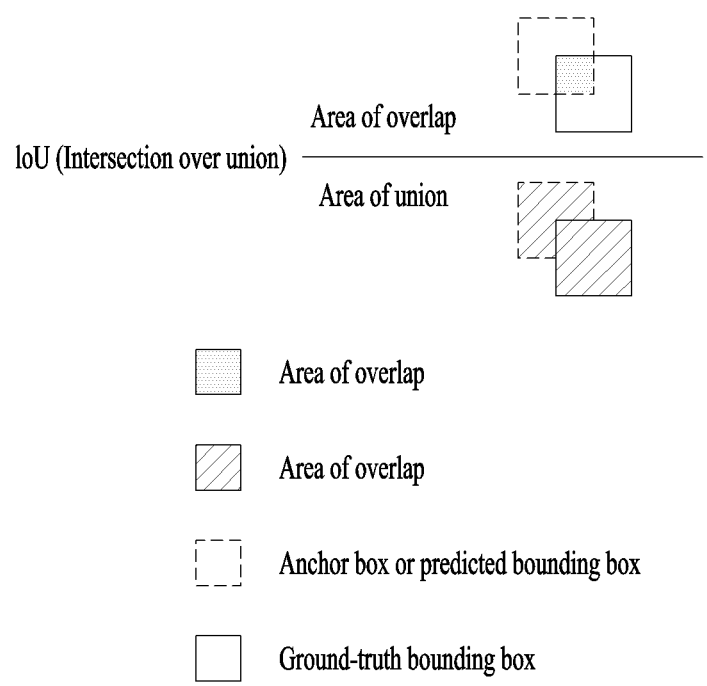
FIG. 8 illustrates an IoU calculation method according to an embodiment of the present disclosure.

FIG. 8 illustrates an IoU calculation method according to an embodiment of the present disclosure.

Referring to FIG. 8, the IoU may be calculated by dividing an area of overlap between an anchor box and a ground-truth bounding box by an area of union of the anchor box and the ground-truth bounding box.

Figure 9:
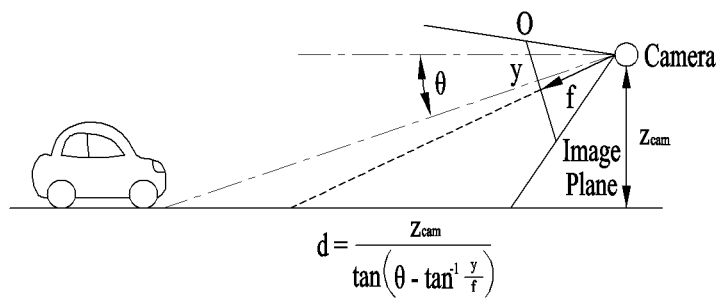
FIG. 9 illustrates a method of calculating a distance to a rear vehicle according to an embodiment of the present disclosure.

FIG. 9 illustrates a method of calculating a distance to a rear vehicle according to an embodiment of the present disclosure.

Referring to FIG. 9, when the ground is assumed to be horizontal, a distance (d) to the recognized rear vehicle may be calculated using Equation 2 below.

$$d = \frac{Z_{cam}}{\tan\left(\theta - \tan^{-1}\frac{y}{f}\right)} \quad \text{[Equation 2]}$$

Here, y is image coordinates, f is a focal point distance as a distance to an image plane from a camera, $Z_{cam}$ is a vertical mounting height value of the camera from the ground, and refers to a vertical mounting angle of the camera.

Here, the focal point distance may be calculated in units of image coordinates.

A surround view monitoring (SVM) system, including a surround view camera, for monitoring surroundings of a vehicle may perform calibration during a vehicle manufacturing process to convert the bird's eye view, and thus information such as the mounting position, mounting angle, and focal point distance of each camera may be predefined and maintained in a memory included in the vehicle.

The operations of the method or algorithm described in regard to embodiments disclosed herein may be implemented in hardware and software modules executed by a processor, or a combination of the two. The software module may always be present in a storage medium (i.e., memory and/or data storage) such as an RAM memory, a flash memory, an ROM memory, an EPROM memory, an EEPROM memory, a register, a hard disk, a removable disk, or a CD-ROM.

An exemplary storage medium may be coupled to a processor, and the processor may read information from, and write information to, the storage medium. Alternatively, the storage medium may be integral with the processor. The processor and storage medium may always be present within an application specific integrated circuit (ASIC). The ASIC may always be present in a user equipment (UE). Alternatively, the processor and storage medium may always be as separate components within the UE.

Embodiments according to the present disclosure may advantageously provide a method of recognizing a vehicle based on an image, and an apparatus and vehicle therefor.

Embodiments according to the present disclosure may advantageously provide a method of recognizing a vehicle based on an image for recognizing a rear vehicle based on an original image of an SVM camera installed on the rear of a vehicle, and an apparatus and vehicle therefor.

Embodiments according to the present disclosure may advantageously provide a method of recognizing a vehicle based on an image for preventing deterioration of performance of a front sensor of a rear vehicle by recognizing a rear vehicle using an existing camera without adding a rear active sensor and separate hardware, and an apparatus and vehicle therefor.

According to embodiments according to the present disclosure, it may be possible to recognize a remote rear vehicle based on an SVM camera image through the proposed object recognition deep learning network, thereby advantageously and effectively preventing a collision with a rear vehicle.

Embodiments according to the present disclosure may advantageously provide a method of recognizing a vehicle based on an image for improving object recognition performance and RCW performance by dynamically determining a learning parameter applied to the proposed object recognition deep learning network according to a time zone, day/night, and weather, and an apparatus and vehicle therefor.

In addition, various effects directly or indirectly identified through this document may be provided.

The above description is merely illustrative of the technical idea of the present disclosure, and various modifications and variations are possible without departing from the essential characteristics of the present disclosure by those skilled in the art to which the present disclosure pertains.

Accordingly, the embodiments disclosed in the present disclosure are not intended to limit the technical spirit of the present disclosure, but to explain, and the scope of the technical spirit of the present disclosure is not limited by these embodiments. The scope of the present disclosure should be interpreted by the following claims, and all technical ideas within the scope equivalent thereto should be construed as being included in the scope of the present disclosure.

What is claimed is:

1. A method of recognizing a rear vehicle, comprising:
   acquiring an image captured by a camera while driving a vehicle;
   determining a time zone based on the acquired image;
   performing object recognition based on the determined time zone;
   determining, based on a result of performing the object recognition, image coordinates of the rear vehicle;
   converting the determined image coordinates into a distance to the rear vehicle,
   wherein determining the time zone includes:
     acquiring an output value of a light sensor;
     rectifying the image;
     calculating an average brightness of the image based on the rectified image; and
     determining the time zone based on the output value of the light sensor and the average brightness of the image,
   wherein the method further comprises setting, based on the determined time zone, a learning parameter of an object recognition deep learning network, and
   wherein the object recognition deep learning network comprises:
     a base network configured to extract a feature from the image; and
     an object detection head configured to classify each of a plurality of anchor boxes as a candidate area with a fixed position through data set learning, and adjust a position and size of a ground-truth bounding box having an intersection over unit (IoU) equal to or greater than a reference value among the classified anchor boxes.

2. The method of claim 1, wherein:
   the time zone includes a nighttime zone and a daytime zone, and
   the method further comprises:
     in response to determining that the determined time zone is the daytime zone, setting a parameter of the object recognition deep learning network to a predefined daytime parameter; and
     in response to determining that the determined time zone is the nighttime zone, setting the parameter of the object recognition deep learning network to a predefined nighttime parameter.

3. The method of claim 2, wherein the nighttime parameter includes a first nighttime parameter for recognizing a headlamp area and a second nighttime parameter for recognizing a rear vehicle area.

4. The method of claim 3, further comprising, in response to determining that the time zone is the nighttime zone, performing:
   acquiring a fixed exposure image by setting the camera to a fixed exposure time;
   recognizing the headlamp area based on the fixed exposure image;
   acquiring an auto exposure image by setting the camera to auto exposure; and
   recognizing the rear vehicle area based on the auto exposure image.

5. The method of claim 4, further comprising:
   determining whether the headlamp area is included in the rear vehicle area; and
   in response to determining that the headlamp area is included in the rear vehicle area, performing:
     determining that a lower end of the rear vehicle area is a lower end of the rear vehicle; and
     calculating a distance to the rear vehicle based on the determined lower end of the rear vehicle and a calibration value of the camera.

6. The method of claim 4, further comprising:
   in response to successfully recognizing the headlamp area and failing to recognize the rear vehicle area, calculating a maximum headlamp mounting height based on a position of the headlamp area;
   determining a lower end of the rear vehicle based on a lower end of the headlamp area and the maximum headlamp mounting height; and
   calculating a distance to the rear vehicle based on the determined lower end of the rear vehicle and a calibration value of the camera.

7. The method of any one of claim 5, wherein the calibration value includes:
   a focal length value indicating a distance to an image plane from the camera;
   a vertical mounting height value to the camera from a ground; and
   a vertical mounting angle value of the camera.

8. The method of claim 1, wherein the camera includes a surround view camera.

9. The method of claim 1, further comprising:
   calculating a speed of the rear vehicle based on a change to the distance for a predetermined time period; and
   outputting a rear collision warning alarm based on the distance and the speed of the rear vehicle.

10. A non-transitory computer-readable medium comprising instructions that, when executed by a processor, cause the processor to control a rear vehicle recognition system to perform:
    acquiring an image captured by a camera while driving a vehicle;
    determining a time zone based on the acquired image;
    performing object recognition based on the determined time zone;
    determining, based on a result of performing the object recognition, image coordinates of the rear vehicle; and
    converting the determined image coordinates into a distance to the rear vehicle, wherein, for determining the time zone, the instructions, when executed by the processor, further cause the processor to control the rear vehicle recognition system to perform:
  acquiring an output value of a light sensor;
  rectifying the image;
  calculating an average brightness of the image based on the rectified image; and
  determining the time zone based on the output value of the light sensor and the average brightness of the image,
wherein the instructions, when executed by the processor, further cause the processor to control the rear vehicle recognition system to perform setting, based on the determined time zone, a learning parameter of an object recognition deep learning network, and
wherein the object recognition deep learning network comprises:
  a base network configured to extract a feature from the image; and
  an object detection head configured to classify each of a plurality of anchor boxes as a candidate area with a fixed position through data set learning, and adjust a position and size of a ground-truth bounding box having an intersection over unit (IoU) equal to or greater than a reference value among the classified anchor boxes.

11. A vehicle comprising:
a camera configured to capture a rear image while driving of the vehicle;
a processor; and
a non-transitory computer-readable medium in communication with the processor and storing instructions that, when executed by the processor, cause the processor to control the vehicle to perform:
  determining a time zone based on the captured rear image;
  recognizing an object based on the determined time zone;
  determining, based on a result of recognizing the object, image coordinates of a rear vehicle; and
  converting the determined image coordinates into a distance,
wherein, for determining the time zone, the instructions, when executed by the processor, further cause the processor to control the vehicle to perform:
  acquiring an output value of a light sensor;
  rectifying the image;
  calculating an average brightness of the image based on the rectified image; and
  determining the time zone based on the output value of the light sensor and the average brightness of the image,
wherein the instructions, when executed by the processor, further cause the processor to control the vehicle to perform setting, based on the determined time zone, a learning parameter of an object recognition deep learning network, and
wherein the object recognition deep learning network comprises:
  a base network configured to extract a feature from the image; and
  an object detection head configured to classify each of a plurality of anchor boxes as a candidate area with a fixed position through data set learning, and adjust a position and size of a ground-truth bounding box having an intersection over unit (IoU) equal to or greater than a reference value among the classified anchor boxes.

12. The vehicle of claim 11, further comprising a data storage configured to store a plurality of learning parameters for the object recognition deep learning network,
wherein, for recognizing the object, the instructions, when executed by the processor, further cause the processor to control the vehicle to perform selecting and setting at least one learning parameter of the plurality of learning parameters according to the determined time zone.

* * * * *